(12) United States Patent
Gilmore

(10) Patent No.: US 7,575,672 B1
(45) Date of Patent: Aug. 18, 2009

(54) SLED MOUNTED SEPARATOR SYSTEM

(76) Inventor: Terry S. Gilmore, 17 Cassia Rd., Odessa, TX (US) 79765

( * ) Notice: Subject to any disclaimer, the term of this patent is extended or adjusted under 35 U.S.C. 154(b) by 533 days.

(21) Appl. No.: 11/592,082

(22) Filed: Nov. 1, 2006

(51) Int. Cl.
*B01D 17/025* (2006.01)
*B01D 17/032* (2006.01)

(52) U.S. Cl. .......................... 210/117; 96/184; 96/185; 96/186; 96/420; 210/149; 210/180; 210/187; 210/521; 210/539; 210/540

(58) Field of Classification Search ................... 210/117
See application file for complete search history.

(56) References Cited

U.S. PATENT DOCUMENTS

| | | | |
|---|---|---|---|
| 2,726,729 A * | 12/1955 | Williams | 96/166 |
| 3,312,044 A * | 4/1967 | McCarter | 96/159 |
| 3,394,530 A * | 7/1968 | O'Neill et al. | 96/159 |
| 7,014,757 B2 * | 3/2006 | Rhodes | 210/188 |

* cited by examiner

*Primary Examiner*—Peter A Hruskoci
(74) *Attorney, Agent, or Firm*—Booth Albanesi Schroeder

(57) ABSTRACT

A mobile separator system for oil and gas well production fluids consisting of a sled supporting a horizontal three phase separator vessel having an upright vessel or blowcase, with an upper section open to a lower section through a check valve, and a vertical two phase vessel mounted beside each other and seated within the horizontal vessel. A direct fired heater in the horizontal vessel provides the required heating for all three vessels. Production fluids tangentially enter the upper section of the upright vessel with gas rising and the fluid descending through a check valve to the lower section and then transferred into the horizontal vessel. The rising gas outlet is connected to the suction of a compressor and discharged under pressure to the intake of the vertical vessel. Separated gas from the horizontal vessel also is directed to the intake of the compressor. Oil and water separated in the horizontal vessel are transferred into storage or pipelines. Gas under pressure in the vertical vessel is discharged into a pipeline and tapped for operating the mobile separator system's instrumentation, controllers, valves and pressurization and also provide fuel gas for the heater.

20 Claims, 3 Drawing Sheets

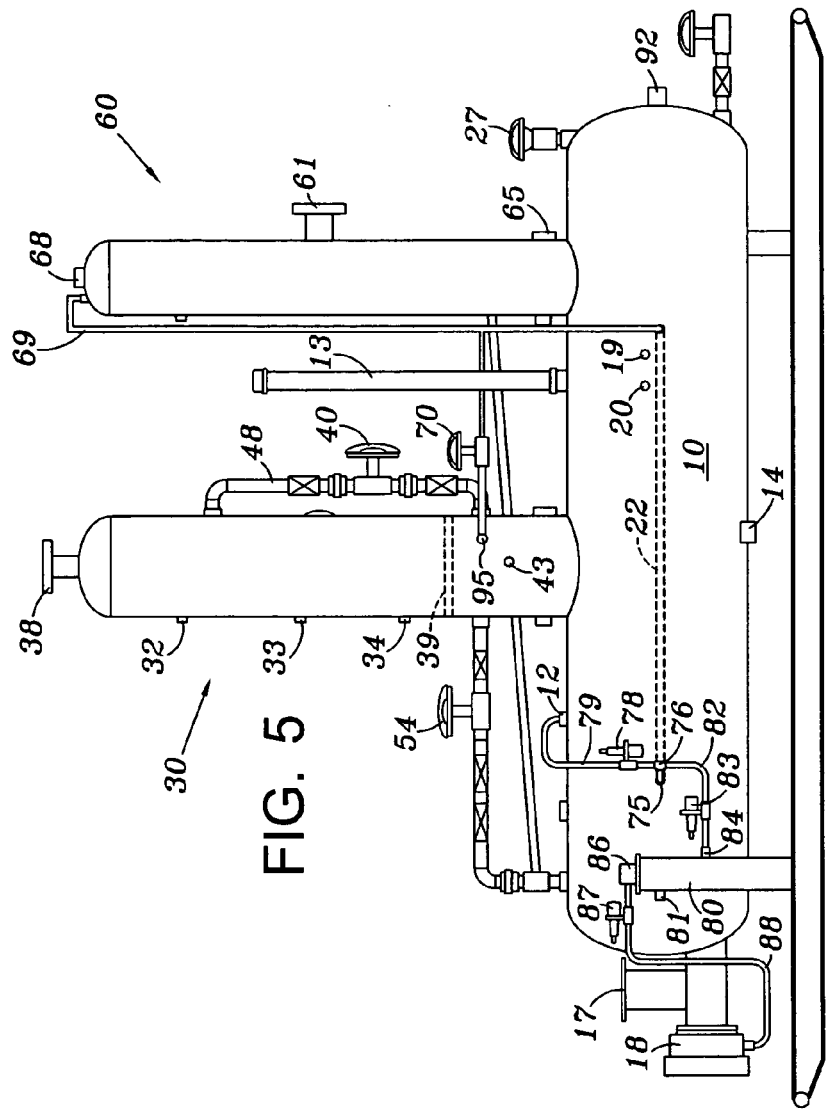
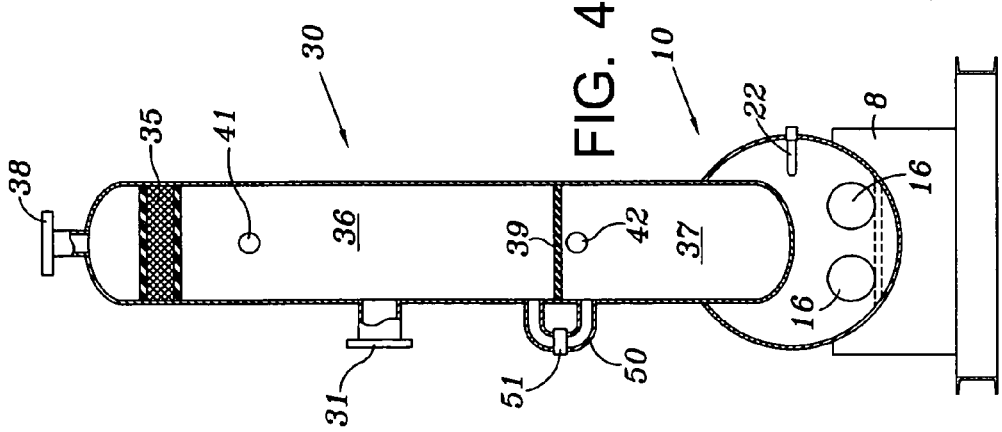
FIG. 5
FIG. 4

SLED MOUNTED SEPARATOR SYSTEM

BACKGROUND OF THE INVENTION

1. Field of the Invention

The present invention relates to an integrated three phase separator system having a vertical blowcase and a vertical separator integrated with a horizontal three phase separator.

2. Description of Related Art

Subterranean oil and gas which is produced from various types of production areas or strata are intermixed resulting in an emulsion of hydrocarbon liquid such as oil, natural gas and water or brine. Various types of field processing separators have been used in the past to separate the mixture coming from a well head into its constituents of natural gas, hydrocarbon liquid and water.

Different types of separator vessels have been used in the past. Horizontal cylindrical vessels typically have more gas capacity than cylindrical vertical vessels of the same diameter. Vertical cylindrical vessels have also been used. In general, vertical vessels handle liquid slugs or surges better than horizontal vessels.

In some cases, separator systems in the prior art have attempted to combine features of both horizontal and vertical vessels in one, as well as, sequentially process through horizontal, vertical or both types of vessels.

For example, Williams (U.S. Pat. No. 2,726,729) discloses a horizontal cylindrical vessel having vertical partitions within a three phase horizontal separator and upright separator sections.

McCarter (U.S. Pat. No. 3,312,044) discloses a horizontal separator with a vertical dome head section with its lower end connected to the horizontal vessel and open thereto for communication with the interior thereof.

O'Neill et al. (U.S. Pat. No. 3,394,530) discloses a horizontal separator with a vertical section near one end of the horizontal section.

Rhodes (U.S. Pat. No. 7,014,757 B2) discloses an integrated three phase separator comprising horizontal and vertical cylindrical sections joined by a 90° cylindrical elbow.

It is known that as oil and gas wells age, the gas pressure tends to be reduced. For example, wells that originally had bottom hole pressures of perhaps 1500 to 2500 psi might later have pressures as low as 200 psi. In some field operations, where the pressure has decreased over time, artificial lift devices and procedures are used to bring the natural gas and liquid hydrocarbons to the surface. When such wells stop producing in paying quantities, they are often plugged and abandoned, converted to injection wells for enhanced production or other uses. Separator systems installed on these locations are costly to remove and install at new locations.

Further, there is a need for a compact, mobile integrated unit providing all the features of separate vessels, horizontal and vertical, receiving and processing fluids from wells for marketing and waste disposal as necessary.

BRIEF SUMMARY OF THE INVENTION

The present invention combines the features of vertical and horizontal separating or treating vessels on a sled or skid mounted mobile integrated unit which may be readily loaded on a flatbed for transporting to another location.

Further, the present invention includes a three phase horizontal separator with a direct fired heater. A vertical blowcase and vertical separator are mounted or seated within the upper portion of the horizontal separator such that the heated fluid in the horizontal separator impart heat to the fluids in the blowcase and vertical separator parts of the integrated unit.

The integrated separator unit or system of the invention includes a sled or skid with a horizontal three phase separator mounted thereon. A burner assembly is provided in the three phase separator to supply heating of the fluid within the horizontal three phase separator, as well as, an upright vessel or blowcase and a vertical separator that are emplaced within the upper half of the horizontal three phase separator, thus fully integrating the vertical separator, blowcase and horizontal three phase separator as a unit separator system which is compact, efficient and sled mounted for ease and convenience in transporting it from one location to another which can easily connect to a compressor, an oil and gas wellhead, a gas sales pipeline and an oil pipeline to storage or other collecting outlet.

The blowcase vessel has a tangential inlet for receiving production fluids and gas from a well in the upper section of the blowcase which includes a mist extractor near the top of the upper section with a gas outlet to a compressor at the top of the blowcase. A circular flat plate divides the lower section of the blowcase from the upper section. Production fluids and entrained gas from the upper section flows into the lower section through a check valve in an external connection. Production fluid from the blowcase is transferred to the horizontal three phase separator through an external connection. Gas exits the blowcase through the mist extractor to the suction inlet of the compressor. The discharge side of the compressor is connected to a vertical vessel or discharge vessel near its center where the gas under pressure enters the discharge vessel. A mist extractor at the top of the vertical vessel removes liquid from the rising gas which exits to a sales outlet. Fluid knocked out of the gas stream collects near the bottom of the vertical separator and is transferred to the horizontal three phase separator. With the blowcase and vertical vessel seated within the horizontal three phase separator, a direct fired heater in the horizontal vessel supplies the heat required for all three vessels to maintain the appropriate temperatures therein. Fluids from both the blowcase and vertical separator are transferred to the horizontal three phase separator where the fluids are separated into a gas phase, oil phase and water. The water is removed through a water outlet, the oil through an oil outlet and the gas through a mist extractor, then is directed to the compressor and recycled through the vertical separator through the mist extractor and into the sales line and charge gas line.

Further, gas from the top of the vertical separator above the mist extractor provides fuel gas, charge gas under pressure, and gas under pressure to the fuel gas volume pot, regulators, liquid level controllers, dump valves, and burner assembly.

BRIEF DESCRIPTION OF THE DRAWINGS

FIG. 4 is a sectional view taken along the line 4-4 in FIG. 1.

FIG. 5 is a reverse side elevation view of the separator system in FIG. 1.

DETAILED DESCRIPTION OF THE INVENTION

Figure 1:
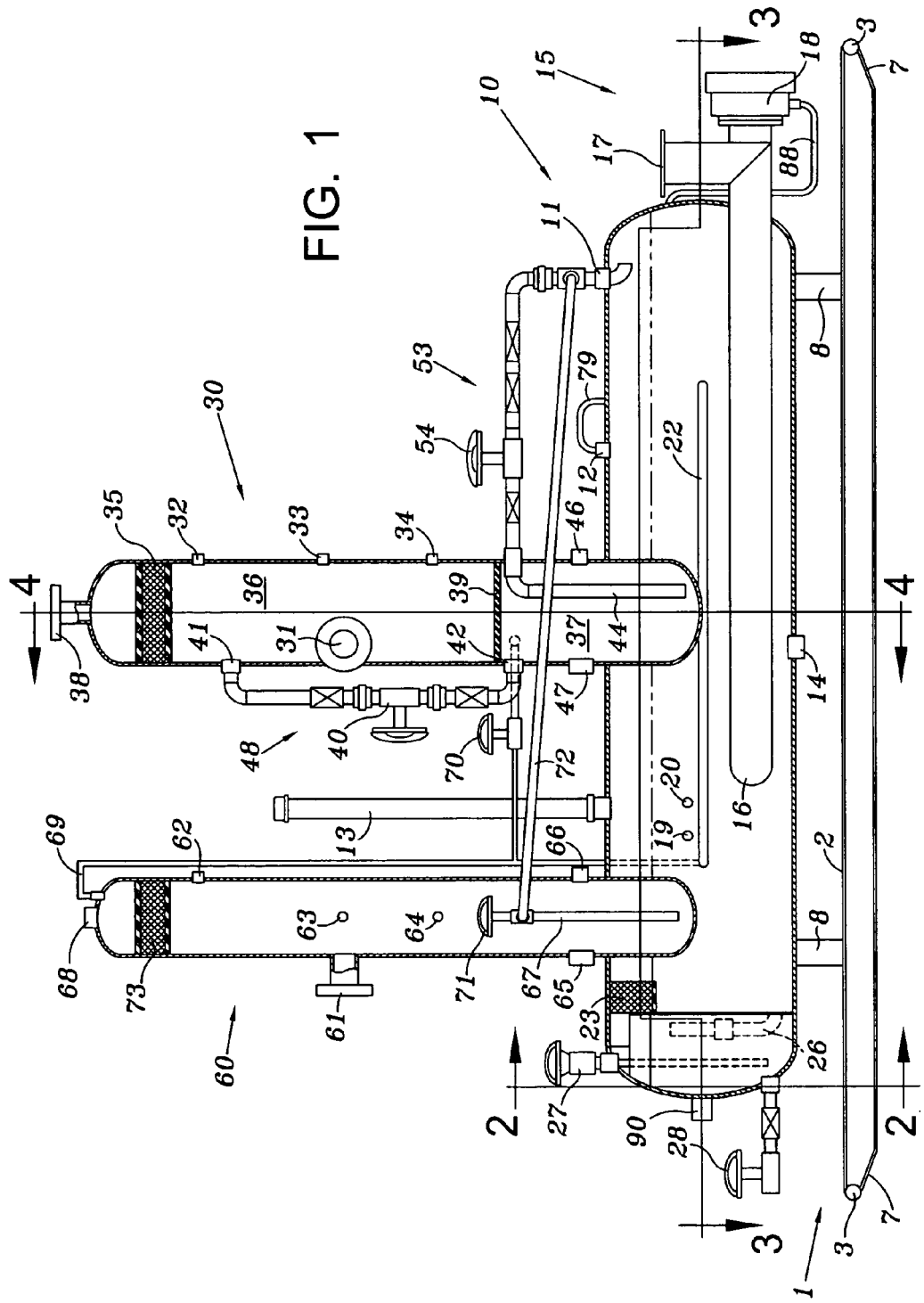
FIG. 1 is a side elevation view in partial cross-section of the sled mounted separator system.
Figure 2:
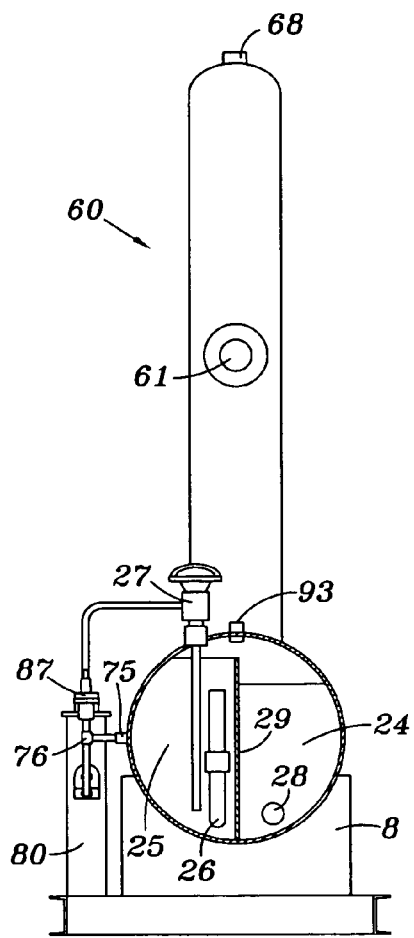
FIG. 2 is a sectional view taken along the line 2-2 in FIG. 1.
Figure 2A:
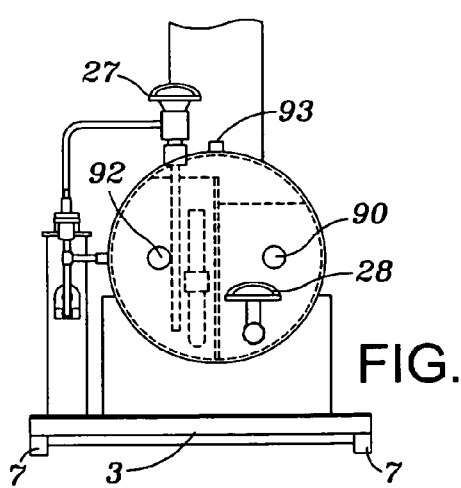
FIG. 2a is a left end view of FIG. 1 with the section view in FIG. 2 shown in phantom.
Figure 3:
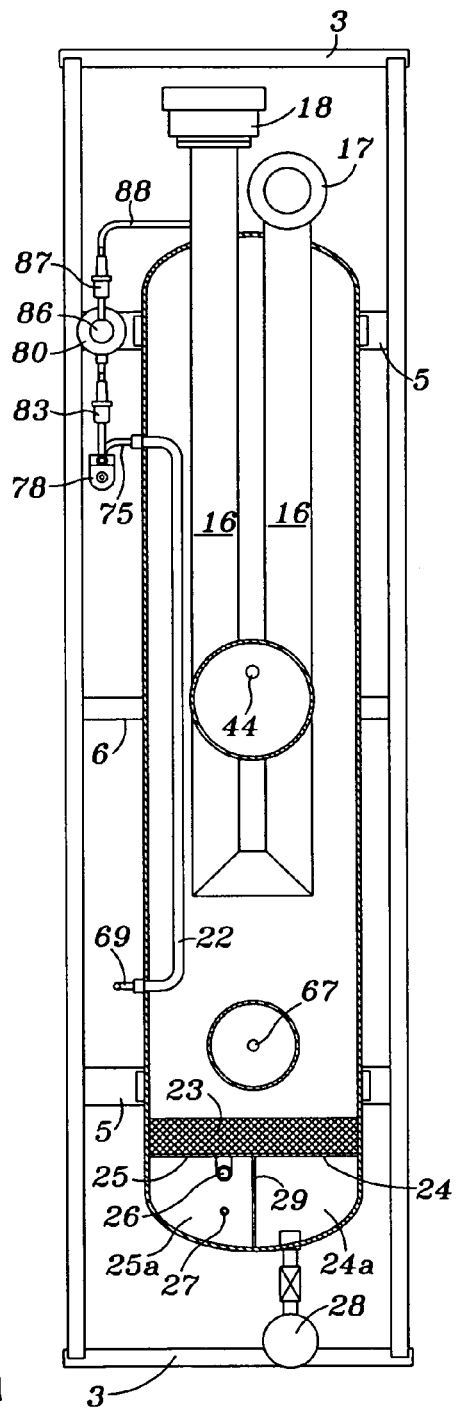
FIG. 3 is a sectional view take along the line 3-3 in FIG. 1.

Referring to the drawings, and in particular to FIGS. 1, 2, 2a and 3, sled or framework 1 consist of two rails 2 of equal dimensions connected by pipe crossties 3 at each end forming a rectangular shape. The end of each rail 2 have upward slants or bevels 7. Central crosstie 6 of channel iron provides stability to the sled 1, likewise, crossties 5 of angle iron and channel iron further stabilize sled 1. Supports 8 are formed by metal plates with sidewalls of a saddle contour. Horizontal vessel 10 is secured to supports 8 in the saddle contour.

Blowcase or upright vessel 30 is mounted within horizontal vessel 10 near its longitudinal middle to a depth of at least a third to about half its diameter. Discharge or vertical vessel 60 is mounted within horizontal vessel 10 spaced from upright vessel 30 near the left end of horizontal vessel 10, as viewed in FIG. 1, to a depth of at least a third to about half its diameter.

Horizontal vessel 10 has fluid inlet 11 for receiving production fluids and entrained gas from upright vessel 30 and vertical vessel 60. Horizontal vessel 10 has a charge gas inlet 12 for entry of gas from vertical vessel 60 to pressurize vessel 10. Relief valve 13 for horizontal vessel 10 prevents excessive pressure buildup therein. Horizontal vessel 10 includes fluid drain 14.

Burner assembly 15 includes heater tube 16, which extend from the right end of horizontal vessel 10, as viewed in FIG. 1, approximately two thirds of its longitude, exhaust stack 17 and direct fired burner 18. Thermometer 19 indicates the temperature in horizontal vessel 10 and gas operated thermostat 20 controls the operation of burner 18.

Referring additionally to FIG. 4, blowcase or upright vessel 30 has intake 31 for receiving production fluid and gas from the well or storage tanks (not shown). Partition 39 separates upright vessel 30 into upper section 36 and lower section 37. Gas equalizer piping 48 coupling upper section 36 and lower section 37 together through apertures 41 and 42, respectively, includes equalizer valve 40 intermediate aperture 41 in upper section 36 and aperture 42 in lower section 37 which allows equalizing the pressure in lower section 37 with the pressure in upper section 36. Above aperture 41 is mist extractor 35 which removes entrained liquid from the gas exiting from gas exit 38 to the intake of a compressor (not shown) capable of reducing the pressure within upright vessel 30 close to zero. Lower section 37 has liquid level control 46 and level glass 47. Upper section 36 is connected to lower section 37 through flow line 50 with check valve 51 therein to permit production fluid entering fluid intake 31 to enter lower section 37 but prevent backflow through valve 51. Siphon 44 is connected to fluid discharge line 53 with time delay dump valve 54 intermediate thereof for transferring production fluids from lower section 37 to fluid inlet 11 in horizontal vessel 10.

Referring particularly to FIGS. 1, 2, 2a and 3, horizontal vessel 10 has a transverse partial partition formed by oil side bulkhead 24 and water side bulkhead 25 which extend above oil bulkhead 24. Longitudinal divider 29 is the same height as bulkhead 25 and with bulkhead 24 and bulkhead 25 forms oil compartment 24a and water compartment 25a. Siphon 26 in water compartment 25a draws water from the water phase in horizontal vessel 10 near its bottom. The oil in the oil phase in horizontal vessel 10 overflows oil side bulkhead 24 into oil compartment 24a. Mist collector 23 (see FIG. 1) extends just below oil bulkhead 24 preventing oil from entering the space above water bulkhead 25 and oil bulkhead 24 where the gas phase collects. Gas outlet 93 is connected to the suction inlet of the compressor (not shown), which also receives gas from gas exit 38 of upright vessel 30. The oil compartment 24a has dump valve 28 and liquid level controller 90. Water compartment 25a has water discharge valve 27 and liquid level controller 92.

FIG. 1 depicts discharge or vertical vessel 60 seated in horizontal vessel 10. Vertical vessel 60 has intake 61 for receiving gas from the discharge side of the compressor (not shown). The suction side of the compressor receives gas passing through mist extractor 35 and leaving upright vessel 30 by way of gas exit 38. Also, the suction side of the compressor receives gas passing through mist extractor 23 and leaving horizontal vessel 10 by way of gas outlet 93 in horizontal vessel 10. Discharge vessel 60 has relief valve 62, pressure gauge 63 and thermometer 64. As gas is compressed it heats up thus retaining higher amounts of liquid, then as it moves through the compressor discharge line to intake 61 the liquid cools and thus discharge vessel 60 collects the liquid knocked out by cooling. Any liquid entering with the discharge gas through intake 61 and any liquid removed by mist extractor 73 collects in the bottom of discharge vessel 60. In response to liquid level control 65, liquid outlet 71 discharges liquid through siphon drain 67 into liquid flow line 72 to fluid inlet 11 in horizontal vessel 10.

Gas leaving discharge vessel 60 through sales gas outlet 68 is under the pressure maintained therein by the compressor which is adequate to meet the pipeline requirements. Gas entering the charge gas line 69 delivers gas to gas charge valve 70 under pressure for periodical preservation of lower section 37 through inlet 95 (see FIG. 5). Charge gas line 69 continues on into preheat line 22 in horizontal vessel 10. Preheated gas exits horizontal vessel 10 at outlet 75 and enters preheat exit tee 76. One side of tee 76 transfers charge gas through pressure regulator 78 in charge gas line 79 to charge gas inlet 12 in horizontal vessel 10 to pressurize horizontal vessel 10 to the appropriate pressure. The other side of tee 76 provides charge gas in line 82, through pressure regulator 83 into gas volume pot 80 which has a relief valve 81. Manifold 86 provides fuel gas through pressure regulator 87 in fuel line 88 to direct fired burner 18. For clarity and to avoid cluttering the drawing with multiple gas lines and pressure regulators, it will be understood that gas volume pot 80 through manifold 86 provides gas under regulated pressure to operate all regulators, liquid level controls, dump valves, thermostat 20 and all other valves including gas equalizer valve 40.

In operation of the separator system, production fluid from an oil well directly or from an on-site storage which may include oil, water and gas, is transferred into blowcase 30 through production fluid intake 31 in upper section 36. The gas entering intake 31 rises and passes through mist extractor 35 and leaves blowcase 30 through gas exit 38 where the gas enters the intake or suction of a compressor (not shown). The oil and water in the production fluid leave upper section 36 by gravity and flow through liquid flow line 50 through check valve 51 into lower section 37. With gas equalizer valve 40 open, gas charge valve 70 closed and dump valve 54 closed, the pressure in blowcase or vertical vessel 30 is near zero such that when production fluid intake 31 is connected directly to the wellhead, the well can produce a very low pressure into section 36 of blowcase 30.

Upon oil and water with some entrained gas reaching a certain level in section 37, liquid level control 46 senses such level and initiates closing gas equalizer valve 40 and opening gas charge valve 70 and liquid dump valve 54 with a time delay, then gas under pressure in charge gas line 69 through open valve 70 forces the oil and water with entrained gas in section 37 up siphon drain 44 through fluid discharge line 53 into horizontal or bottom vessel 10 through inlet 11. Upon the liquid level control 46 sensing sufficient drop in the level, then liquid level control 46 causes gas charge valve 70 and dump valve 54 both to close and the gas equalizer valve 40 to open which allows the pressure in section 36 and section 37 of blowcase 30 to equalize.

Horizontal vessel 10 is a three phase separator with a direct fired heater 18 of burner assembly 15 having heater tubes 16 which extend into bottom vessel 10 approximately six feet adequately heating the production fluid entering from blowcase 30; and the contents in the lower section 37 of blowcase 30 and in two phase vertical separator 60. The temperature in horizontal vessel 10 and blowcase 30 and vertical separator 60 is controlled by gas operated thermostat 20 supplied with pressure regulated gas from manifold 86. Charge gas line 69 delivers gas under pressure through gas preheat line 22 to tee 76 and regulator 78 into charge gas inlet 12 to provide the appropriate pressure in horizontal vessel 10 for its operations. Gas line 82 with regulator 83 provides gas under pressure to volume pot 80 which delivers gas from manifold 86 into fuel line 88 with regulator 87 that supplies direct fired heater 18. The exhaust from direct fired heater 18 exits exhaust stack 17.

The end of horizontal vessel 10 oppose from the burner assembly 15 includes oil baffle 24 which extends from the bottom of vessel 10 to above the bottom of mist extractor 23, water baffle 25 which extends from the bottom of vessel 10 higher than oil baffle 24 to near the middle of mist extractor 23. In the center longitudinal divider 29 extends from the bottom of vessel 10 to the height of water baffle 25, thereby defining oil compartment 24a and water compartment 25a. Water from the bottom of vessel 10 on heater tube 16 side of horizontal vessel 10 is siphoned by water siphon 26 into the water compartment 25a. Oil from heater tube 16 side of horizontal vessel 10 overflows baffle 24 through mist extractor 23 into oil compartment 24a. Liquid level controller 90 activates oil dump valve 28 when the oil reaches a predetermined level to remove separated oil in oil compartment 24a from horizontal vessel 10. Liquid level controller 92 activates water valve 27 to lower the water level in water compartment 25a so water will not overflow baffle 25 into oil compartment 24a.

When gas pressure in horizontal vessel 10 becomes excessive, sufficient gas leaves vessel 10 through mist extractor 23 and through gas outlet 93 (with back pressure valve) to the suction side of the compressor and then into intake 61 of vertical separator 60.

The external compressor discharges its intake from gas exit 38 of upright vessel 30 and gas outlet 93 of horizontal vessel 10 directly into intake 61 of discharge or vertical separator 60 with sufficient pressure to transfer gas into a gas sales line at or above its line pressure. Any oil entering intake 61 with the gas accumulates in the bottom of vertical separator 60 and liquid outlet 71 in response to liquid level controller 65 opens and oil collected in vertical separator 60 enters siphon drain 67 and into liquid line 72, then feeds into horizontal vessel through fluid inlet 11. It should be understood that manifold 86 distributes gas at regulated pressure to supply all valves operated by liquid level controllers with gas pressure to operate. For example, when liquid level controller 46 in lower section 37 of blowcase 30 senses a level of production fluid in lower section 37 it supplies regulated gas pressure from manifold 86 of gas volume pot 80 to close gas equalizer valve 40 to maintain low pressure in upper section 36 of blowcase 30, opens gas charge valve to supply pressure to lower section 37 to discharge production fluid therein through delay discharge or dump valve 54 which opens in response to liquid level controller 46 into horizontal vessel 10 through fluid inlet 11.

It will be understood that the preferred embodiment of the invention has been disclosed, but the invention is not limited thereto. In fact, many possible variations and modifications may be apparent to those skilled in the art without departing from the basic idea of the invention such as defined in the appended claims.

What is claimed is:

1. A sled mounted separator system for oil and gas well production fluids comprising:
   a) a pair of spaced apart rails linked together by at least four lateral crossties forming a framework;
   b) at least two supports mounted on the framework;
   c) a horizontal vessel affixed upon the supports including:
      (i) a first vertical vessel seated within and inwardly from one end of the horizontal vessel; and
      (ii) a second vertical vessel positioned between the other end and the first vertical vessel and seated within the horizontal vessel;
   d) the first vertical vessel including:
      (i) a partition defining an upper section and a lower section, the upper section externally connected through a check valve to the lower section;
      (ii) a controllable pressure equalizer means between the upper section and the lower section;
      (iii) an inlet in the upper section for receiving production fluids from an oil well;
      (iv) a liquid outlet in the lower section; and
      (v) a gas outlet in the upper section for connection to an intake of a compressor with an intake and a discharge;
   e) the second vertical vessel including:
      (i) a gas sales outlet;
      (ii) a supply gas outlet coupled to:
         A. a first charge gas inlet in the lower section of the first vertical vessel;
         B. a second charge gas inlet in the horizontal vessel; and
         C. a gas volume pot affixed to the framework;
      (iii) an intake for connecting to the compressor discharge; and
      (iv) a liquid outlet;
   f) the horizontal vessel further including:
      (i) an inlet for receiving liquid from the first vertical vessel and the second vertical vessel;
      (ii) a direct fired heater therein for heating the contents thereof and the contents in the first vertical vessel and the second vertical vessel;
      (iii) a compartmental section for segregating the separated gas, oil and water;
      (iv) a discharge means for the oil removal;
      (v) a discharge means for the water removal; and
      (vi) a gas outlet for connection to the compressor intake.

2. The separator system of claim 1 wherein the first vertical vessel and the second vertical vessel depend at least below an operating fluid level in the horizontal vessel.

3. The separator system of claim 1 wherein the first vertical vessel and the second vertical vessel extend a sufficient distance into the horizontal vessel for fluids therein to be heated therewith.

4. The separator system of claim 1 wherein the gas volume pot has a manifold for distribution of gas to gas operated instruments.

5. The separator system of claim 1 wherein two of said lateral crossties are pipes that link the rails at opposed ends.

6. The separator system of claim 1 wherein the rail ends are upwardly slanted.

7. The separator system of claim 1 wherein the gas outlet in the upper section is above a mist extractor in the upper section.

8. The separator system of claim 1 wherein the gas sales outlet and the supply gas outlet are above a mist extractor in the second vertical vessel.

9. The separator system of claim 1 wherein the supply gas outlet is coupled through a preheat line in the horizontal vessel to the horizontal vessel and the gas volume pot.

10. A portable separator system for oil and gas well production fluids comprising:
 a) a framework having at least two crossties and two end pieces;
 b) a support extending from each of two such crossties;
 c) a horizontal vessel mounted upon the supports including:
  (i) an upright vessel secured centrally within the horizontal vessel; and
  (ii) a vertical vessel secured within the horizontal vessel juxtaposed the upright vessel;
 d) The upright vessel including:
  (i) a partition forming an upper section and a lower section, the upper section connected through an external passageway to the lower section;
  (ii) a controllable gas equalizer means between the upper and lower sections;
  (iii) an inlet in the upper section for receiving production fluids containing oil, water and gas from an oil well;
  (iv) a fluid outlet in the lower section connected to an inlet in the horizontal vessel; and
  (v) a gas outlet in the upper section above a mist extractor for connection to an intake of a compressor;
 e) The vertical vessel including:
  (i) an inlet for connection to a discharge of the compressor;
  (ii) a fluid outlet connected to the inlet in the horizontal vessel;
  (iii) a gas sales exit for connection to a gas pipeline; and
  (iv) a gas charge outlet for providing operating gas for the separator system's instrumentation, controllers, valves, thermostat, pressurization and fuel;
 f) The horizontal vessel further including:
  (i) a direct fired heater for burning fuel from the gas charge outlet and heating fluids therein, the fluids in the upright vessel and the fluids in the vertical vessel;
  (ii) a compartmental section nearest the vertical vessel for segregating water, oil and gas separated from the oil production fluid;
  (iii) a discharge means for oil removal;
  (iv) a discharge means for water removal; and
  (v) a gas outlet for connection to the compressor intake.

11. The separator system of claim 10 wherein the charge gas outlet is connected to the lower section of the upright vessel for periodically pressurizing the lower section.

12. The separator system of claim 10 wherein the charge gas outlet is connected through a preheat line to a charge gas inlet in the horizontal vessel for pressurization.

13. The separator system of claim 10 wherein the charge gas outlet is connected through the preheat line to a gas volume pot for distribution of gas to the direct fired heater and the instrumentation, controllers and valves.

14. The separator system of claim 13 wherein the charge gas pot provides gas to a thermostat for control of the direct fired heater.

15. A mobile separator system for treating oil and gas well production fluids comprising:
 a) a sled having a pair of side runners, a pair of end pieces spanning the runners and support means extending above the sled;
 b) a horizontal vessel affixed to the support means including:
  (i) an upright vessel mounted within the horizontal vessel; and
  (ii) a vertical vessel mounted within the horizontal vessel near the upright vessel;
 c) the upright vessel including:
  (i) a partition forming an upper section and a lower section;
  (ii) the upper section connected to the lower section through a coupling with a check valve therein;
  (iii) a controllable gas pressure equalizer means coupled between the upper section and the lower section;
  (iv) an inlet in the upper section for receiving production fluids from an oil well;
  (v) a liquid outlet in the lower section; and
  (vi) a gas outlet in the upper section for connection to a compressor suction;
 d) the vertical vessel including:
  (i) an inlet for connection to the compressor discharge;
  (ii) a liquid outlet connected to the inlet in the horizontal vessel
  (iii) a gas outlet for connection to a pipeline;
  (iv) a charge gas outlet for providing gas under pressure for operation of the separator system; and
 e) the horizontal vessel further including:
  (i) a direct fired heater fueled with gas supplied from the charge gas outlet for heating fluids in the horizontal vessel, fluids in the upright vessel and fluids in the vertical vessel;
  (ii) a compartmental section for segregating oil, water and gas separated from the production fluids from the oil well;
  (iii) a discharge means for oil withdrawal;
  (iv) a discharge means for water withdrawal; and
  (v) a gas outlet for connection to the compressor suction.

16. The separator system of claim 15 wherein the charge gas outlet is coupled through a gas preheat line in the horizontal vessel to a gas volume pot for supplying gas to the direct fired heater.

17. The separator system of claim 16 wherein the gas volume pot includes a manifold for distributing gas to the separator system valves and controllers.

18. The separator system of claim 15 wherein the end pieces are cylindrical.

19. The separator system of claim 15 wherein the gas outlet in the upper section is just above a mist extractor.

20. The separator system of claim 15 wherein the upright vessel and the vertical vessel extend medially within the horizontal vessel.

* * * * *